(12) United States Patent
Tonami et al.

(10) Patent No.: US 7,791,030 B2
(45) Date of Patent: Sep. 7, 2010

(54) NUCLEAR MEDICAL DIAGNOSTIC DEVICE

(75) Inventors: Hiromichi Tonami, Kyoto (JP); Junichi Ohi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 86 days.

(21) Appl. No.: 12/376,488

(22) PCT Filed: Sep. 19, 2006

(86) PCT No.: PCT/JP2006/318536

§ 371 (c)(1),
(2), (4) Date: Feb. 5, 2009

(87) PCT Pub. No.: WO2008/035400

PCT Pub. Date: Mar. 27, 2008

(65) Prior Publication Data

US 2010/0127179 A1    May 27, 2010

(51) Int. Cl.
*G01T 1/166* (2006.01)
(52) U.S. Cl. .................................. 250/363.05
(58) Field of Classification Search ............ 250/252.1, 250/363.02, 363.03, 363.04, 363.05
See application file for complete search history.

(56) References Cited

U.S. PATENT DOCUMENTS 6,064,068 A * 5/2000 Bartle ........................ 250/369

FOREIGN PATENT DOCUMENTS

| JP | 06-337289 | 12/1994 |
| JP | 2000-056023 | 2/2000 |
| JP | 2003-21682 | 1/2003 |

* cited by examiner

*Primary Examiner*—David P Porta
*Assistant Examiner*—Marcus H Taningco
(74) *Attorney, Agent, or Firm*—J.C. Patents

(57) ABSTRACT

Parameters T1, T2, and K required by a scintillator array identification mechanism in a two-stage scintillator γ-ray detector (depth of interaction (DOI)) are accurately and easily determined. The parameters required by the scintillator array identification mechanism are determined with reference to a first signal count ratio, which is obtained by irradiating a γ-ray on each scintillator array with luminescence pulses in an incident depth direction of the γ-ray having different attenuation time during an inspection stage of the γ-ray detector single unit. Furthermore, a second signal count ratio is obtained by irradiating the γ-ray on a front surface of the γ-ray detector single unit, and then a third signal count ratio is obtained by irradiating the γ-ray on the front surface after the γ-ray detector single unit is installed in a PET device.

4 Claims, 10 Drawing Sheets

NUCLEAR MEDICAL DIAGNOSTIC DEVICE

BACKGROUND OF THE INVENTION

1. Field of the Invention

The present invention generally relates to a nuclear medical diagnostic device (an emission computed tomography (ECT) device), in which an radioactive agent is applied to a test subject, and a pair of γ-rays discharged by positron radioactive isotopes (RIs) accumulated in a target portion of the test subject is measured concurrently, so as to obtain a tomogram of the target portion. In particular, the present invention relates to a technique of counting γ-rays at the same time.

2. Description of Related Art

A positron emission tomography (PET) device is taken as an example to illustrate a nuclear medical diagnostic device, that is, an ECT device. The PET device is formed in the following manner. Opposite γ-ray detectors are used to detect two γ-rays at an angle of approximately 180° discharged from a target portion of a test subject. When the γ-rays are detected (counted) at the same time, a tomogram of the detected body is formed again. Further, some of the γ-ray detectors used to count the γ-rays at the same time in the PET device are formed by scintillators and photomultipliers. The scintillators then emit light after the γ-rays discharged from the test subject are incident thereon, and the photomultipliers convert the light emitted by the scintillators to an electric signal.

In principle and in most cases, the γ-rays discharged from a visual field centre are obliquely incident on the scintillators of the γ-ray detector D as shown in FIG. 16. When the divided scintillator is not present in the γ-ray incident direction, the γ-ray is detected in both the correct positions and incorrect positions. That is, the visual difference error becomes larger from the visual field centre to the peripheral parts, such that the tomogram obtained by the PET device becomes inaccurate.

Therefore, as shown in FIG. 17, a γ-ray detector is provided. In the γ-ray detector, the scintillators are divided (optically combined) into scintillators having the luminescence pulses in the γ-ray incident direction with different attenuation times. For example, when a γ-ray detector MD is used, in which the scintillators are divided into a scintillator array with a shorter γ-ray attenuation time on a γ-ray incident side and a scintillators array with a longer γ-ray attenuation time on a photomultiplier side, the positions of the discharged γ-rays can still be detected accurately even if the γ-rays are obliquely incident on the scintillators of the γ-ray detector MD. A more accurate tomogram is resulted, and improvement is achieved (for example, please refer to Patent Reference 1 and 2).

Further, the specific mechanism for detecting the γ-ray position with respect to the scintillator array with the shorter attenuation time and the scintillator array with the longer attenuation time, stacked in the γ-ray incident direction, includes the following mechanisms: an adding mechanism for converting an electric signal output from a light receiving element, that is, converting an analog signal $S_F$ (the signal of the scintillator array with the shorter attenuation time) or $S_R$ (the signal of the scintillator array with the longer attenuation time) to a digital signal by using an A/D converter as shown in FIG. 18, and adding sequentially the digital signals converted by the A/D converter as shown in FIG. 19; an identification value calculating mechanism for calculating an identification value representing a value $A_{T1}/A_{T2}$ or $B_{T1}/B_{T2}$ obtained by dividing an intermediate added value $A_{T1}$ or $B_{T1}$ by a total added value $A_{T2}$ or $B_{T2}$, in which the intermediate added value $A_{T1}$ or $B_{T1}$ is a value obtained by adding the digital signals during a period starting from the point at which the luminescence of the luminescence pulse is emitted from the scintillator block to an intermediate point of the period at which the luminescence ends, that is, to an intermediate moment in the adding mechanism, and the total added value $A_{T2}$ or $B_{T2}$ is a value obtained by adding the digital signals during a period starting from the point at which luminescence of the luminescence pulse is emitted from the scintillator block to point at which the luminescence ends, in the adding mechanism; a mechanism for deciding a medium value K according to a maximum value and a minimum value in the identifying values calculated by the identification value calculating mechanism; and a determination mechanism for determining whether an identification value calculated by the identification value calculating mechanism is greater or smaller than the medium value K.

Moreover, the existing nuclear medical diagnostic device determines the parameters used for judging in the following manner. That is, in the case of a two-stage scintillator detector 112, for example, having scintillator arrays of a two-stage structure as shown in FIG. 20, parameters $T_1$, $T_2$, and K required by the scintillator array identification mechanism are decided in the following manner. In an inspection stage of the γ-ray detector single unit, the two-stage scintillator detector 112 disposed in a dark box 115 inputs the parameter of an initial value to a processing circuit for inspection, starts to irradiate γ-ray on a front surface 110 of the scintillator array, and then calculates a signal count $N_1$ and a signal count $N_2$ through a determination calculation, in which the signal count $N_1$ is determined as the count of signals from the front surface 110 of the scintillator array, and the signal count $N_2$ is determined as the count of signals from a rear surface 111 of the scintillator array. Thereafter, as shown in FIG. 21, the γ-ray is only irradiated on the rear surface 111 of the scintillator array, and a signal count $N_2'$ and a signal count $N_1'$ are calculated through a determination calculation, in which the signal count $N_2'$ is determined as the count of signals from the rear surface 111 of the scintillator array, and the signal count $N_1'$ is determined as the count of signals from the front surface 110 of the scintillator array. Further, as shown in FIG. 22, when a ray source is not used, and on a background of a natural radioactive ray 116, a signal count $N_{1b}$ and a signal count $N_{2b}$ are calculated through a determination calculation, in which the signal count $N_{1b}$ is determined as the count of signals from the front surface 110 of the scintillator array, and the signal count $N_{2b}$ is determined as the count of signals from the rear surface 111 of the scintillator array. Then, $(N_1-N_{1b})/(N_2-N_{2b})$ and $(N_2'-N_{2b})/(N_1'-N_{1b})$ are defined. When $(N_1-N_{1b})/(N_2-N_{2b})$ and $(N_2'-N_{2b})/(N_1'-N_{1b})$ are equal and are the maximum, the parameters are defined as the optimal parameters. Further, a lead collimator 13 and a Ri ray source 114 are required to ensure that the γ-ray is irradiated on only any one of the scintillator arrays. The parameters decided in the above manner are pre-input to a processing circuit for the device during the stage in which the γ-ray detector single unit is installed in the actual PET device.

Patent Reference 1: Japanese Patent Publication No. H06-337289 (Page 2 to 3 and FIG. 1)

Patent Reference 2: Japanese Patent Publication No. 2000-56023 (Page 2 to 3 and FIG. 1)

However, the existing nuclear medical diagnostic device has the following problem. In the case of the two-stage scintillator detector 112, for example, having the scintillator arrays of the two-stage structure as shown in FIG. 20, the parameters $T_1$, $T_2$, and K required by the scintillator array identification mechanism are decided by the processing circuit for inspection during the inspection stage of the γ-ray detector 12 single unit, and these parameters are applied to the processing circuit for the device during the stage in which the γ-ray detector single unit is installed in the actual PET device. No matter the processing circuit for inspection and the processing circuit for the device are manufactured based on the same specification, temperature characteristics of a gain amplifier or other elements may be slightly different, so as to generate individual differences. Therefore, the optimal values of the parameters are not necessarily consistent, such that it is impossible to separate upper and lower parts, resulting in adverse impact on the image quality.

In another aspect, if it is intended to decide the parameters during the stage in which the γ-ray detector single unit is installed in the actual PET device, a large lead calibration jig and Ri ray source matching with the PET device are required, so the operation is quite complicated.

SUMMARY OF THE INVENTION

In order to solve the above problems, according to one aspect of the present invention, it is to provide a nuclear medical diagnostic device which adopts the following structure. That is, the nuclear medical diagnostic device includes a plurality of γ-ray detectors, a processing circuit for the device, a frame, a parameter deciding mechanism for identification, and an identification mechanism. Each of the γ-ray detectors is composed of a scintillator block, a light receiving element, and an A/D converter, in which the scintillator block is formed by optically combining a plurality of scintillator arrays with luminescence pulses having different attenuation times in a γ-ray incident depth direction, the light receiving element converts the luminescence pulse emitted from the scintillator block to an electric signal, and the A/D converter converts the electric signal output from the light receiving element, i.e., an analog signal, to a digital signal. The processing circuit for the device is used for calculating a signal count ratio according to the digital signals from the γ-ray detectors. The frame is for installing the plurality of γ-ray detectors. The parameter determining mechanism for identification is used for calculating a first signal count ratio according to the digital signal obtained by irradiating the γ-ray on each scintillator array and obtaining a second signal count ratio by irradiating the γ-ray on the scintillator block and performing a measurement when the plurality of γ-ray detectors are not respectively installed in the frame but are connected to a processing circuit for inspection that is different from the processing circuit for the device, and obtaining a third signal count ratio by irradiating the γ-ray on the respective scintillator block of the γ-ray detectors and performing a measurement when the plurality of γ-ray detectors are respectively installed in the frame and are connected to the processing circuit for the device, and deciding the parameters for identification according to the first signal count ratio, the second signal count ratio, and the third signal count ratio. The identification mechanism is used for identifying which scintillator array of the plurality of γ-ray detectors is irradiated by the γ-ray of a measurement object according to the parameters for identification.

Further, according to one aspect of the present invention, the second signal count ratio and the third signal count ratio are obtained by irradiating the γ-ray on a front surface or a rear surface of the scintillator block and performing the measurement.

Further, according to one aspect of the present invention, the second signal count ratio and the third signal count ratio are obtained by irradiating the γ-ray on a lateral side of the scintillator block and performing the measurement.

Further, according to one aspect of the present invention, a ray source for transmission is used to irradiate the γ-ray for obtaining the third signal count ratio.

Effect of the Invention

Through the above means, the optimal parameters may be decided. By using the optimal parameters, the position of a γ-ray source of the measurement object may be accurately assigned, so as to provide a high-quality tomogram.

Further, by dividing the measurement into a measurement of the γ-ray detector single units and a measurement of the γ-ray detectors installed in the frame, the optimal parameters may be easily determined.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
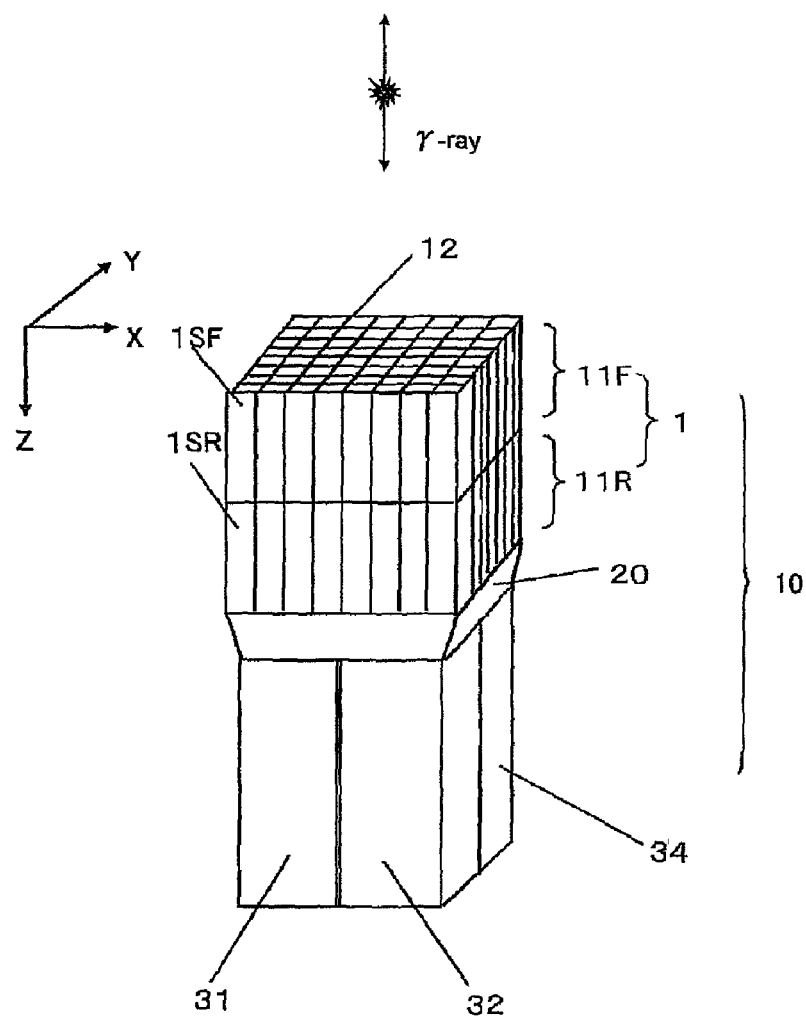
FIG. 1 is an outside view of a γ-ray detector of the present invention.

Reference will now be made in detail to the present embodiments of the invention, examples of which are illustrated in the accompanying drawings. Wherever possible, the same reference numbers are used in the drawings and the description to refer to the same or like parts.

First Embodiment

The detailed structure of a γ-ray detector according to the first embodiment of the present invention is shown in the drawings and is illustrated in the following. FIG. 1 is an outside view of a γ-ray detector 10 having scintillator arrays of a two-stage structure of the present invention. As shown in FIG. 1, in the γ-ray detector 10, a scintillator block 1 is arranged by being divided in a γ-ray incident depth direction, that is, the radiation detector 10 is a depth of interaction (DOI) γ-ray detector having three-dimensionally arranged scintillators. The DOI γ-ray detector of this embodiment has scintillator arrays of a two-stage structure.

The γ-ray detector 10 of this embodiment is approximately formed by four parts. The first part is a scintillator array 11F having scintillators 1SF that are two-dimensionally and compactly arranged and have a luminescence pulse with a shorter attenuation time. The scintillators 1SF are divided by appropriately sandwiching a light reflective material 12, and 64 scintillators 1SF are arranged in a manner of having eight scintillators in the X direction and eight scintillators in the Y direction. The second part is a scintillator array 11R having scintillators 1SR that are two-dimensionally and compactly arranged and have a longer attenuation time of the luminescence pulse. The scintillators 1SR are divided by appropriately sandwiching the light reflective material 12 there-between, and 64 scintillators 1SR are arranged in a manner having eight scintillators in the X direction and eight scintillators in the Y direction. The scintillator array 11F and the scintillator array 11R form the scintillator block 1. The third part is a light guide 20, which is optically combined with the scintillator block 1, includes embedded lattice frames combined with a light reflective material 13 (not shown), and is divided into a plurality of small areas. The fourth part is four photomultipliers 31, 32, 33, and 34 respectively to optically combine with the light guide 20.

The scintillators 1SF having the luminescence pulse with a shorter attenuation time employ, for example, inorganic crystals, such as $Gd_2SiO_5$:Ce1.5 mol % (GSO:Ce1.5 mol %), $Gd_2SiO_5$:Ce1.5 mol % (GSOZ:Ce1.5 mol %) doped with Zr, $Lu_2SiO_5$:Ce(LSO), LuYSiO$_5$:Ce(LYSO), $LaBr_3$:Ce, $LaCl_3$:Ce, and LuI:Ce. In another aspect, the scintillators 1SR having the luminescence pulse with a longer attenuation time employ inorganic crystals, such as $Gd_2SiO_5$:Ce0.5 mol % (GSO:Ce0.5 mol %), $Gd_2SiO_5$:Ce0.5 mol % (GSOZ:Ce0.5 mol %) doped with Zr, $Bi_4Ge_3O_{12}$ (BGO), and $Lu_{0.4}Gd_{1.6}SiO_5$:Ce (LGSO).

Table 1 lists data of the attenuation time of each scintillator.

TABLE 1

| Scintillator | Attenuation Time [ns] |
|---|---|
| $Gd_2SiO_5$:Ce1.5 mol % (GSO:Ce1.5 mol %) | 40 |
| $Gd_2SiO_5$:Ce1.5 mol % (GSOZ:Ce1.5 mol %) doped with Zr | 40 |
| $Lu_2SiO_5$:Ce (LSO) | 40 |
| LuYSiO$_5$:Ce (LYSO) | 40 |
| $LaBr_3$:Ce | 27 |

TABLE 1-continued

| Scintillator | Attenuation Time [ns] |
|---|---|
| $LaCl_3$:Ce | 70 |
| LuI:Ce | 25 |
| $Gd_2SiO_5$:Ce0.5 mol % (GSO:Ce0.5 mol %) | 80 |
| $Gd_2SiO_5$:Ce0.5 mol % (GSOZ:Ce0.5 mol %) doped with Zr | 80 |
| $Bi_4Ge_3O_{12}$ (BGO) | 300 |
| $Lu_{0.4}Gd_{1.6}SiO_5$:Ce (LGSO) | 43 |

The scintillator block 1 is formed by optically combining the two scintillator arrays 11F and 11R having luminescence pulses with different attenuation times in the γ-ray incident depth direction (Z direction). The scintillator array 11F has a plurality of scintillators 1SF that is two-dimensionally and compactly arranged and has a luminescence pulse with a shorter attenuation time, and the scintillator array 11R has a plurality of scintillators 1SR that is two-dimensionally and compactly arranged and has a luminescence pulse with a longer attenuation time. Particularly, in the scintillator block 1, for example, $Gd_2SiO_5$:Ce1.5 mol % (GSO:Ce1.5 mol %) is used as the scintillators 1SF having the luminescence pulse on a γ-ray incident side (front segment) with a shorter attenuation time, and $Gd_2SiO_5$:Ce0.5 mol % (GSO:Ce0.5 mol %) is used as the scintillators 1SR having the luminescence pulse on the light guide 20 side (back segment) with a longer attenuation time.

The two scintillator arrays 11F and 11R are respectively formed by 8×8 (in the X direction and Y direction) chip-shaped scintillators, and the light reflective material 12, a light transmissive material (not shown), or an optical binding agent (not shown), which enables the light generated when the γ-ray is incident to distribute in the X direction and Y direction according to a ratio, are sandwiched or filled in some positions between the chip-shaped scintillators.

The light guide 20 guides the light generated by the scintillators 11F and 11R of the scintillator block 1 to the photomultipliers 31~34. The light guide 20 is sandwiched between the scintillator block 1 and the photomultipliers 31~34 in an optically combining manner by using the optical binding agent.

The light generated by the scintillator arrays 11F and 11R is incident on photomultiplier photoelectric conversion films on four sides, and is electronically amplified, and then is finally converted to electric signals (analog signals) for output. Therefore, the outputs of the photomultipliers 31~34 become the output of the γ-ray detector 10.

Here, the light in the scintillator block 1 is guided to the photomultipliers 31~34 by the optically combined light guide 20. At this time, the position, length, and angle of each light reflective material 13 (not shown) in the light guide 20 are adjusted, such that the output ratio of the photomultiplier 31 (33) and the photomultiplier 32 (34) arranged in the X direction is changed according to a fixed proportion.

Figure 2:
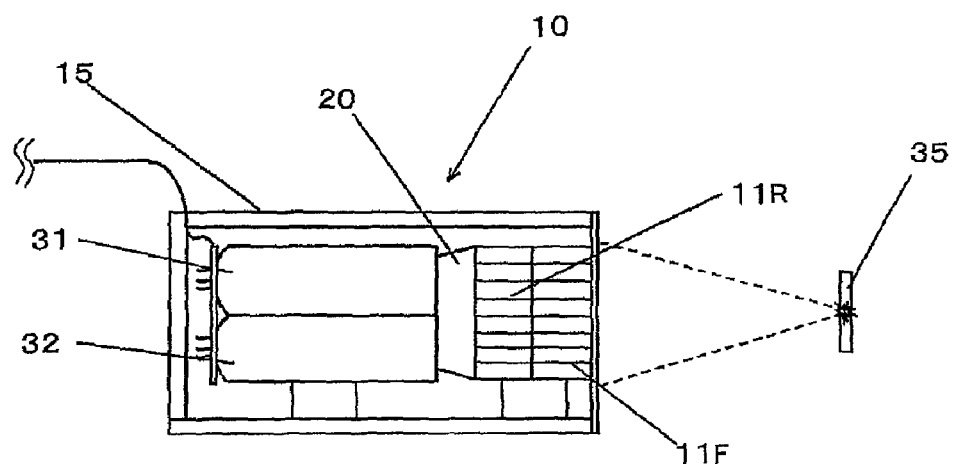
FIG. 2 is an illustrative view of a method for identifying a scintillator array of the present invention.

Here, in the present invention, the parameters T1, T2, and K required by the scintillator array identification mechanism are decided in the following manner. As shown in FIG. 2, a Ri ray source 35 irradiates from the front the γ-ray on the γ-ray detector 10 having scintillator arrays of the two-stage structure and disposed in the dark box 15, and a position coding map and an energy spectrum are measured. That is, if the output of the photomultiplier 31 is set to P1, the output of the photomultiplier 32 is set to P2, the output of the photomultiplier 33 is set to P3, and the output of the photomultiplier 34 is set to P4, a calculated value {(P1+P3)−(P2+P4)}/(P1+P2+P3+P4) representing a position in the X direction is obtained, and a calculated value {(P1+P2)−(P3+P4)}/(P1+P2+P3+P4) representing a position in the Y direction is also obtained.

Figure 3:
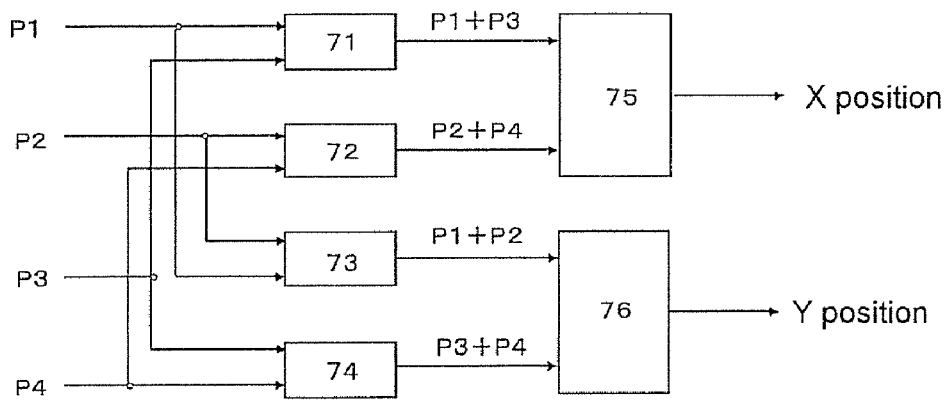
FIG. 3 is an illustrative view of an example of a position operating circuit of the γ-ray detector of the present invention.
Figure 4:
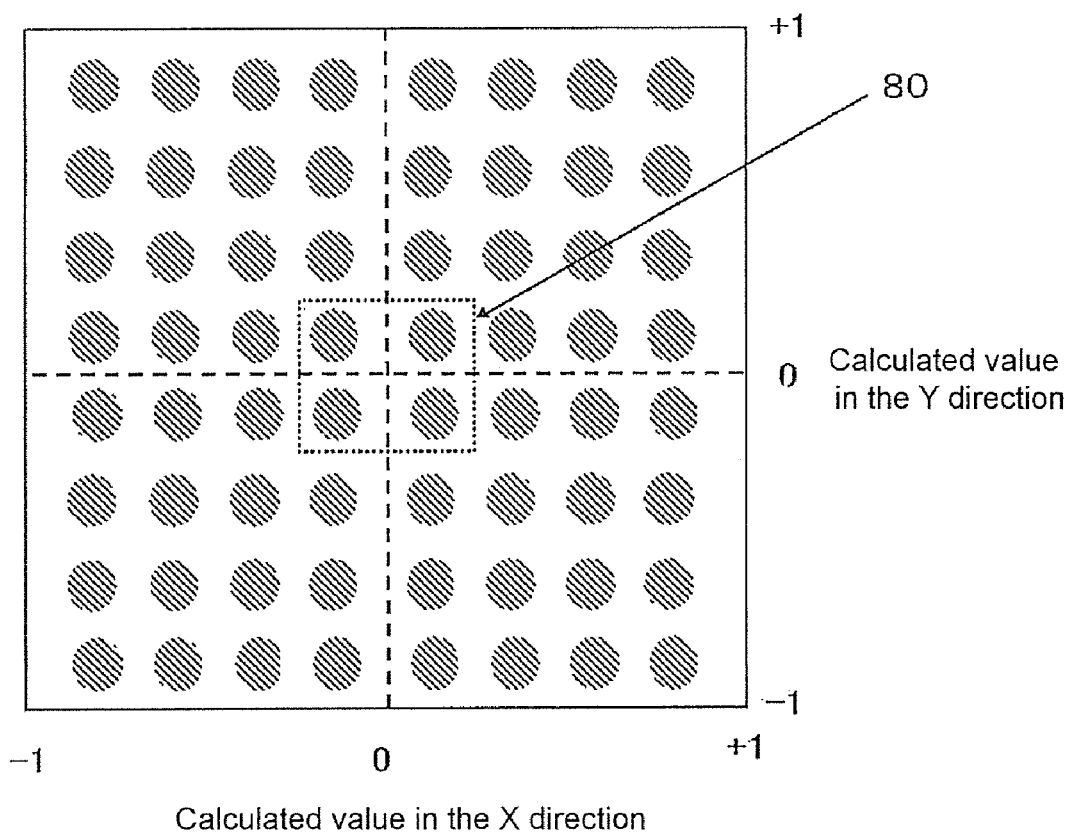
FIG. 4 is an illustrative view of a position coding map of the γ-ray detector of the present invention.

FIG. 3 is a block diagram of a structure of a position operating circuit of the γ-ray detector 10. The position operating circuit is formed by adders 71, 72, 73, and 74, and position recognizing circuits 75 and 76. As shown in FIG. 3, in order to detect the incident position of the γ-ray in the X direction, the output P1 of the photomultiplier 31 and the output P3 of the photomultiplier 33 are input to the adder 71, and the output P2 of the photomultiplier 32 and the output P4 of the photomultiplier 34 are input to the adder 72. Each added output (P1+P3) and (P2+P4) of the two adders 71 and 72 are input to the position recognizing circuit 75. According to the two added outputs, the incident position of the γ-ray in the X direction is obtained. Similarly, in order to detect the incident position of the γ-ray in the Y direction, each added output (P1+P2) and (P3+P4) are input to the position recognizing circuit 76. According to the two added outputs, the incident position of the γ-ray in the Y direction is obtained. According to the positions of the γ-ray incident on the scintillators, the calculated results obtained above are represented by the position coding map showing the position recognition information, as shown in FIG. 4.

Figure 5:
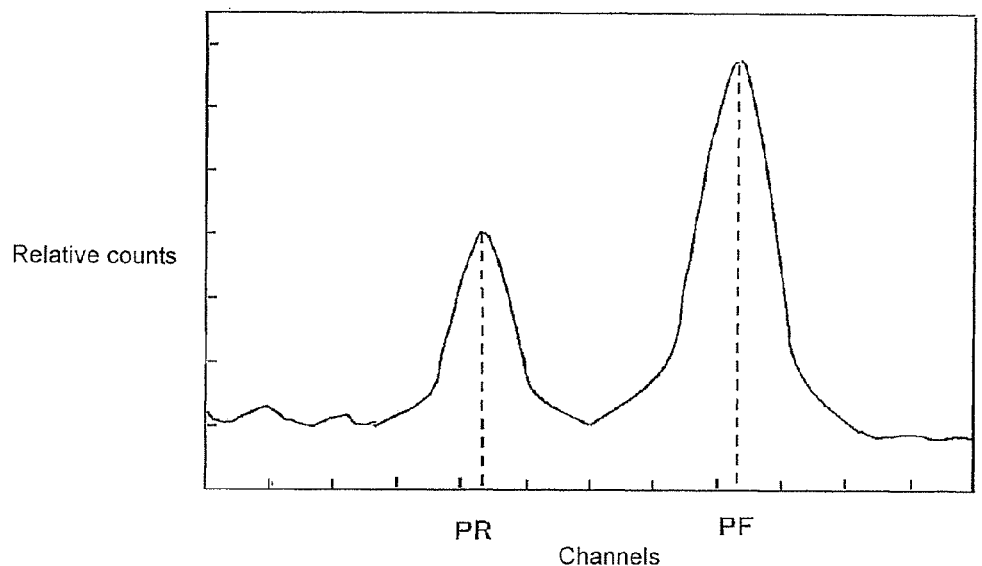
FIG. 5 is an energy spectrum of the γ-ray detector of the present invention.

In another aspect, the calculated value (P1+P2+P3+P4) represents the energy relative to the event, and is calculated as an energy spectrum. As an example, FIG. 5 is an energy spectrum relative to a representing portion 80 on the position coding map. Here, the luminescence outputs of the two scintillators are different, so two energy peak values PF and PR occur. In this embodiment, PF is equivalent to $Gd_2SiO_5$: Ce1.5 mol % (GSO: Ce1.5 mol %) and PR is equivalent to $Gd_2SiO_5$: Ce0.5 mol % (GSO: Ce0.5 mol %).

Figure 6:
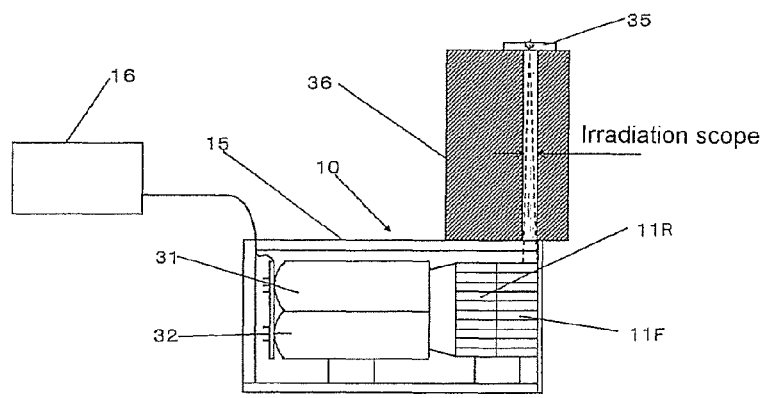
FIG. 6 is an illustrative view of a method for deciding parameters according to a first embodiment.

For the γ-ray detector 10 having the scintillator arrays of the two-stage structure, the method for deciding the parameters $T_1$, $T_2$, and K required by the scintillator array identification mechanism is illustrated. As shown in FIG. 6, during a first inspection stage of the γ-ray detector single unit, the γ-ray detector 10 is disposed in the dark box 15, and initial values of the parameters are input to a processing circuit for inspection 16. In this state, the γ-ray from the Ri ray source 35 calibrated by the lead collimator 36 only irradiates onto the scintillator array 11F. According to the input parameters, in the processing circuit for inspection 16, a signal count $N_1$ and a signal count $N_2$ are calculated through a determination calculation, in which the signal count N1 is judged as the count of signals from the scintillator array 11F, and the signal count N2 is judged as the count of signals from the scintillator array 11R.

Figure 7:
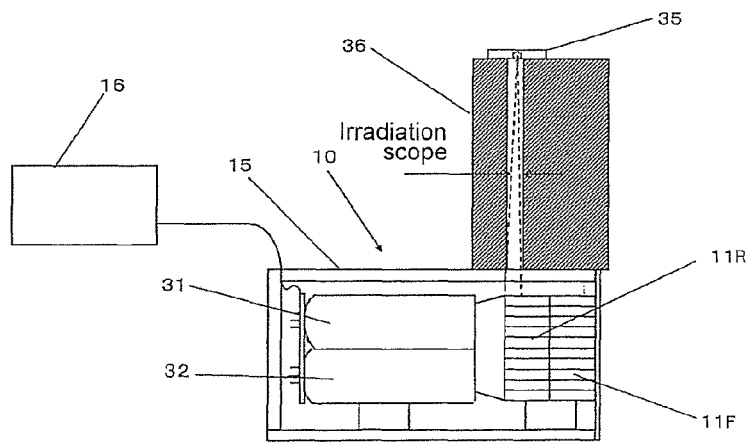
FIG. 7 is an illustrative view of the method for deciding the parameters according to the first embodiment.

Then, as shown in FIG. 7, the γ-ray from the Ri ray source 35 calibrated by the lead collimator 36 only irradiates onto the scintillator array 11R. According to the input parameters, in the processing circuit for inspection 16, a signal count $N_2'$ and a signal count $N_1'$ are calculated through a determination calculation, in which the signal count N2' is determined as the count of signals from the scintillator array 11R, and the signal count N1' is determined as the count of signals from the scintillator array 11F.

Figure 8:
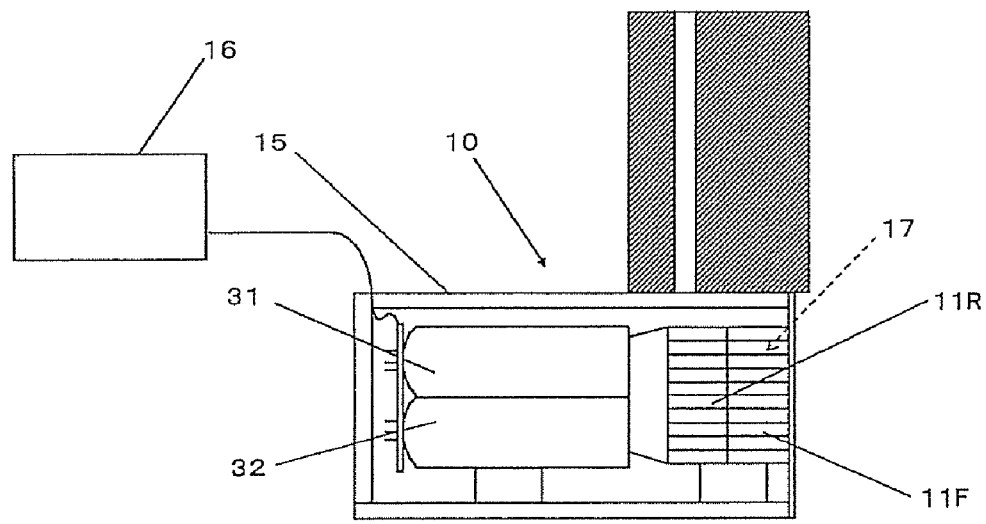
FIG. 8 is an illustrative view of the method for deciding the parameters according to the first embodiment.

Further, as shown in FIG. 8, when the ray source is not used, mainly the count caused by a natural radioactive ray 17 is measured. On the state of a background, in the processing circuit for inspection 16, a signal count $N_{1b}$ and a signal count $N_{2b}$ are calculated through a determination calculation, in which the signal count $N_{1b}$ is determined as the count of signals from the scintillator array 11F, and the signal count $N_{2b}$ is determined as the count of signals from the scintillator array 11R.

Here, $R_1=(N_1-N_{1b})/(N_2-N_{2b})$ and $R_1'=(N_2'-N_{2b})/(N_1'-N_{1b})$ are defined as a first signal count ratio. When the values of R and R' are equal and become the maximum, the parameters $T_1$, $T_2$, and K are defined as the optimal parameters.

Figure 9:
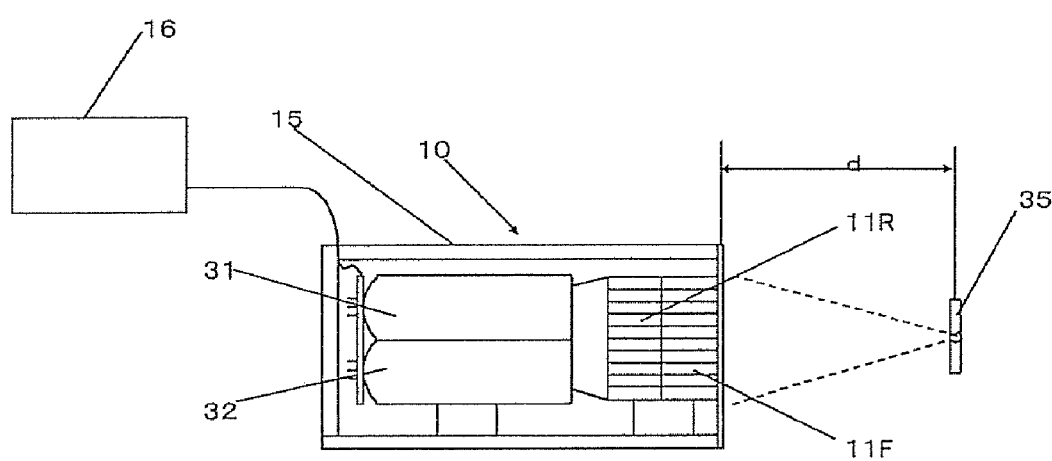
FIG. 9 is an illustrative view of the method for identifying the scintillator array according to the first embodiment.

Then, as shown in FIG. 9, during a second inspection stage of the γ-ray detector single unit, the γ-ray detector 10 is disposed in the dark box 15, the optimal parameters $T_1$, $T_2$, and K decided above are input to the processing circuit for inspection 16. In this state, the Ri ray source 35 is arranged at a distance d relative to the γ-ray detectors 10, and irradiates the γ-ray on the front surface of the γ-ray detectors 10. The distance d is equal to a distance from the center of the PET device to the surface of the γ-ray detector. According to the input parameters, in the processing circuit for inspection 16, a signal count $N_F$ and a signal count $N_R$ are calculated through the determination calculation, in which the signal count $N_F$ is determined as the count of signals from the scintillator array 11F, and the signal count $N_R$ is determined as the count of signals from the scintillator array 11R. Here, $R_2=N_F/N_F$ is defined as a second signal count ratio. Until now, it is the inspection stage of the γ-ray detector single unit.

Figure 10:
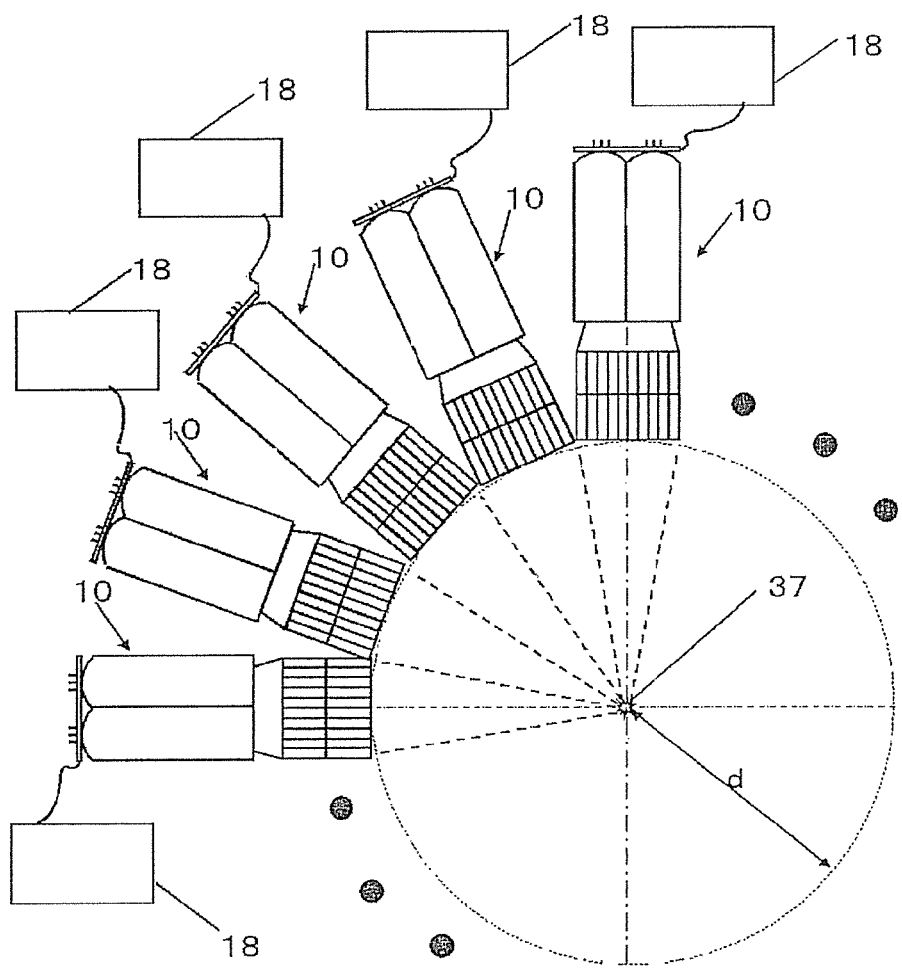
FIG. 10 is a schematic view of a frame with a plurality of γ-ray detectors installed therein.

As shown in FIG. 10, during a third inspection stage, the plurality of γ-ray detectors 10 is installed in a frame (not shown) according to the actual number of the formed PET devices. Each γ-ray detector 10 is connected to a processing circuit for the device 18. FIG. 10 only shows the γ-ray detectors disposed along ¼ of the entire circumference, but in reality, the γ-ray detectors are present along the entire circumference, and the γ-ray detectors are accommodated in an appropriate dark box (not shown). In addition, it is preferred that the frame actually forming the PET device is being used as the frame; but, a dedicated frame for inspection may also be used.

No matter the processing circuit for inspection 16 and the processing circuit for the device 18 used during the inspection stage are manufactured according to the same specification, temperature characteristics of a gain amplifier or other elements may be slightly different, so as to generate individual differences. Therefore, the optimal parameters $T_1$, $T_2$, and K determined above are not necessarily consistent, such that the optimal parameters must be decided again, but the optimal parameters $T_1$, $T_2$, and K determined above are temporarily used as the initial values and are input to the processing circuit for the device 18. Then, as shown in FIG. 10, a Ri ray source 37 is arranged on the center position of the PET device at the distance d relative to all the γ-ray detectors 10, and irradiates the γ-ray on the front surfaces of all the γ-ray detectors 10.

According to the input parameters, in the processing circuit for the device 18, a signal count $N_F'$ and a signal count $N_R'$ are calculated through the determination calculation, in which the signal count $N_F'$ is determined as the count of signals from the scintillator array 11F, and the signal count $N_R'$ is judged as the count of signals from the scintillator array 11R.

In this invention, $R_3=N_F'/N_R'$ is defined as a third signal count ratio. Therefore, the condition of the parameters that enables the second signal count ratio $R_2=N_F/N_R$ obtained above and the third signal count ratio $R_3=N_F'/N_R'$ calculated this time being equal is identified, and the parameters are defined as optimal parameter values $T'_1$, $T'_2$, and K' required by the scintillator array identification mechanism.

As described above, the optimal parameter values $T'_1$, $T'_2$, and K' are decided by making the second signal count ratio in the inspection stage and the third signal count ratio of the PET device be equal, such that the optimal parameter values may be determined correctly.

Second Embodiment

The detailed structure of the γ-ray detector according to the second embodiment of the present invention is shown in the drawings and is illustrated in the following. This embodiment is used for the situation in which the optimal values are more strictly decided. The scintillator array identification mechanism defines the first signal count ratio, which is $R_1=(N_1-N_{1b})/(N_2-N_{2b})$ and $R_1'=(N_2'-N_{2b})/(N_1'-N_{1b})$, obtained during the first inspection stage of the γ-ray detector single unit, and defines the parameters $T_1$, $T_2$, and K when the values of R and R' are equal and become the maximum as the optimal values. Until now, the process is the same as that of the first embodiment (FIGS. 6 to 8).

Figure 11:
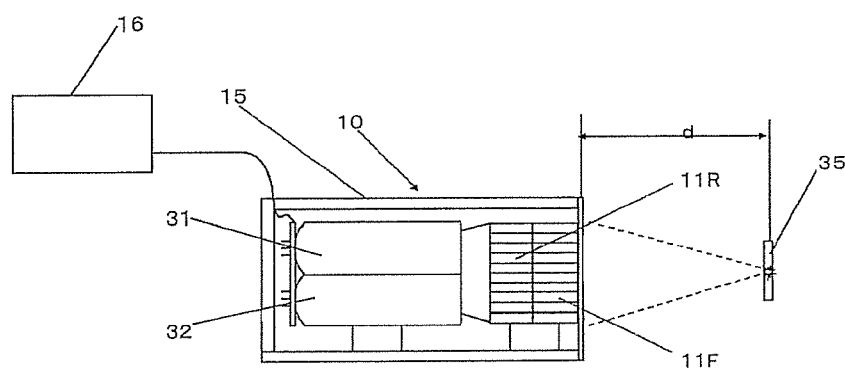
FIG. 11 is an illustrative view of the method for deciding parameters according to a second embodiment.

As shown in FIG. 11, during a second inspection stage of the γ-ray detector single unit, the γ-ray detector 10 is disposed in the dark box 15, the optimal parameters $T_1$, $T_2$, and K decided above are input to the processing circuit for inspection 16. In this state, the Ri ray source 35 is arranged on a position at a distance d relative to the γ-ray detectors 10, and irradiates the γ-ray on the front surfaces of the γ-ray detectors 10. The distance d is equal to a distance from the center of the PET device to the surface of the γ-ray detectors. According to the input parameters, in the processing circuit for inspection 16, a signal count $N_F$ and a signal count $N_R$ are calculated through the judging calculation, in which the signal count $N_F$ is judged as the count of signals from the scintillator array 11F, and the signal count $N_R$ is judged as the count of signals from the scintillator array 11R. In this invention, $R_2=N_F/N_F$ is defined as a second signal count ratio.

Figure 12:
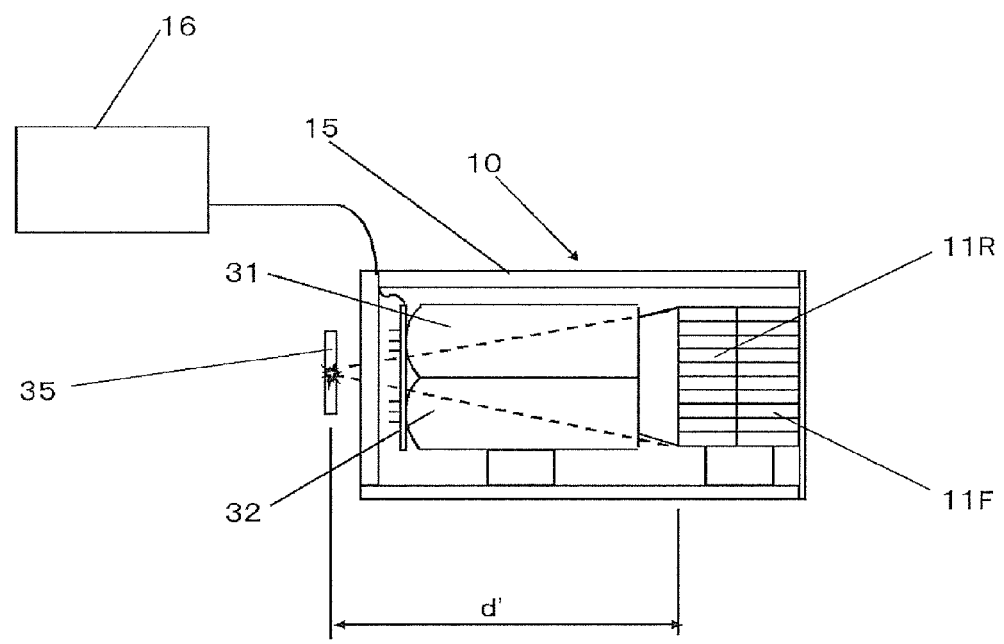
FIG. 12 is an illustrative view of the method for deciding the parameters according to the second embodiment.

Further, i as shown in FIG. 12, the Ri ray source 35 is arranged on a position at a distance d' relative to the γ-ray detectors 10, and irradiates the γ-ray on the rear surfaces of the γ-ray detectors 10. The distance d' is equal to a distance from the rear surfaces of the γ-ray detectors 10 to the Ri ray source when the γ-ray detectors are installed in the PET device. According to the input parameters, in the processing circuit for inspection 16, a signal count $N_{Fb}$ and a signal count $N_{Rb}$ are calculated through the determination calculation, in which the signal count $N_{Fb}$ is determined as the count of signals from the scintillator array 11F, and the signal count $N_{Rb}$ is determined as the count of signals from the scintillator array 11R. In this invention, $R_{2b}=N_{Fb}/N_{Rb}$ is defined as the second signal count ratio. Until now, it is the inspection stage of the γ-ray detector single unit.

Figure 13:
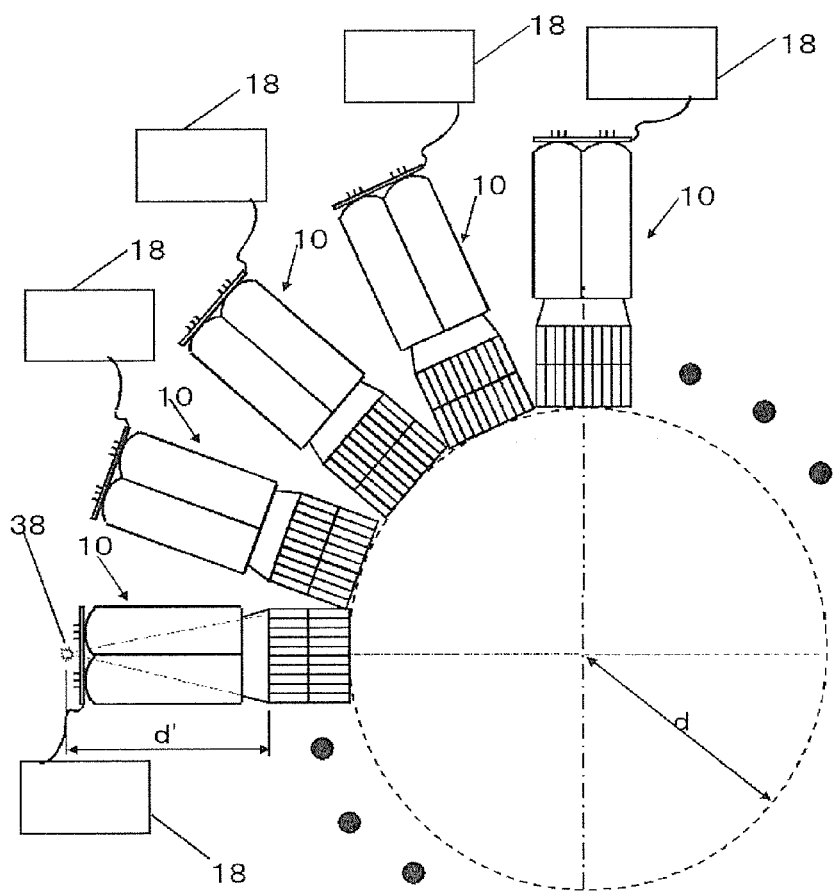
FIG. 13 is an illustrative view of the method for deciding the parameters according to the second embodiment.

Then, as shown in FIG. 13, during a third inspection stage, the plurality of γ-ray detectors 10 is installed in a frame (not shown) according to the actual number of the formed PET devices. Each γ-ray detector 10 is connected to a processing circuit for the device 18. FIG. 13 only shows the γ-ray detectors disposed along a ¼ of the entire circumference, but in reality, the γ-ray detectors are disposed along the entire circumference, and the γ-ray detectors are accommodated in an appropriate dark box (not shown). In addition, it is preferred that the frame actually forming the PET device is being used as the frame; but, a dedicated frame for inspection may also be used.

No matter the processing circuit for inspection 16 and the processing circuit for the device 18 used during the inspection stage are manufactured according to the same specification, temperature characteristics of a gain amplifier and other elements may be slightly different, so as to generate individual differences. Therefore, the optimal parameters $T_1$, $T_2$, and K decided above are not necessarily consistent, such that the optimal parameters must be decided again, but the optimal parameters $T_1$, $T_2$, and K decided above are temporarily used as the initial values and are input to the processing circuit for the device 18. Then, as shown in FIG. 13, an Ri ray source 37 is arranged on the center position of the PET device at the distance d relative to all the γ-ray detectors 10, and irradiates the γ-ray on the front surfaces of all the γ-ray detectors 10.

According to the input parameters, in the processing circuit for the device 18, a signal count $N_F'$ and a signal count $N_R'$ are calculated through the determination calculation, in which the signal count $N_F'$ is determined as the count of signals from the scintillator array 11F, and the signal count $N_R'$ is judged as the count of signals from the scintillator array 11R. Here, $R_3=N_F'/N_F'$ is defined as a third signal count ratio. Therefore, the condition of the parameters that enables the second signal count ratio $R_2=N_F/N_R$ obtained above and the third signal count ratio $R_3=N_F'/N_R'$ calculated this time being equal is identified, and the parameters are defined as optimal parameter values $T'_1$, $T'_2$, and K' required by the scintillator array identification mechanism.

Further, as shown in FIG. 13, for all the γ-ray detectors 10, an Ri ray source 38 (although the Ri ray source 37 is shown, here the Ri ray source 37 does not exist) is arranged on a position of the PET device at the distance d' relative to all the γ-ray detectors 10, and irradiates sequentially the γ-ray on the rear surfaces of all the γ-ray detectors 10.

According to the input parameters, in the processing circuit for the device 18, a signal count $N_{Fb}'$ and a signal count $N_{Rb}'$ are calculated through the determination calculation, in which the signal count $N_{Fb}'$ is determined as the count of signals from the scintillator array 11F, and the signal count $N_{Rb}'$ is determined as the count of signals from the scintillator array 11R. In this invention, $R_3=N_{Fb}'/N_{Rb}'$ is defined as the third signal count ratio. Therefore, the condition of the parameters that enables the second signal count ratio $R_2=N_{Fb}/N_{Rb}$ obtained above and the third signal count ratio $R_3=N_{Fb}'/N_{Rb}'$ calculated this time being equal is identified, and the parameters are defined as optimal parameter values $T''_1$, $T''_2$, and K'' required by the scintillator array identification mechanism.

Moreover, medium values of the optimal parameter values $T'_1$, $T'_2$, and K' and the optimal parameter values $T''_1$, $T''_2$, and K'' are respectively used, such that the optimal parameter values may be decided more correctly.

Third Embodiment

The detailed structure of the γ-ray detector according to the third embodiment of the present invention is shown in the drawings and is illustrated in the following. The scintillator array identification mechanism defines the first signal count ratio, which is $R_1=(N_1-N_{1b})/(N_2-N_{2b})$ and $R_1'=(N_2'-N_{2b})/(N_1'-N_{1b})$, obtained during the first inspection stage of the γ-ray detector single unit, and defines the parameters $T_1$, $T_2$, and K when the values of R and R' are equal and become the maximum as the optimal values. Until now, the process is the same as that of the first embodiment (FIGS. 6 to 8).

Figure 14:
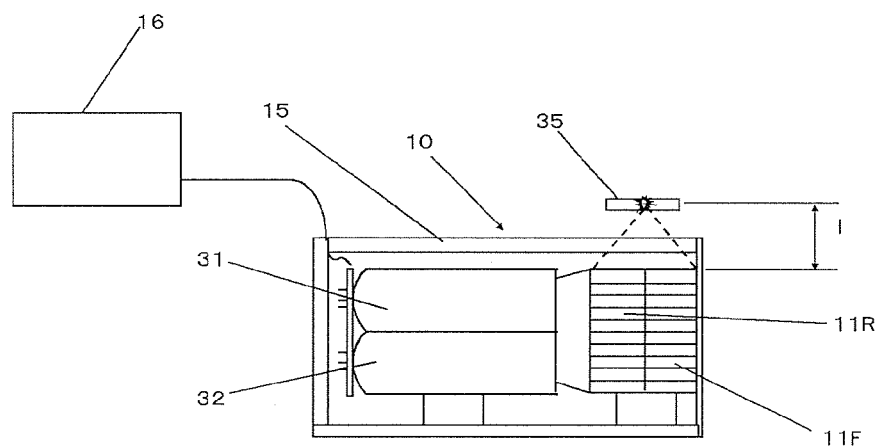
FIG. 14 is an illustrative view of the method for deciding the parameters according to a third embodiment.

Then, as shown in FIG. 14, during a second inspection stage of the γ-ray detector single unit, the γ-ray detector 10 is disposed in the dark box 15, the optimal parameters $T_1$, $T_2$, and K decided above are input to the processing circuit for inspection 16. In this state, the Ri ray source 35 is arranged on a position at a distance l relative to the γ-ray detectors 10, and irradiates the γ-ray on a lateral side of the γ-ray detectors 10. The distance l is equal to a distance from a ray source for transmission on the PET device to the surface of the γ-ray detector. According to the input parameters, in the processing circuit for inspection 16, a signal count $N_{Fc}$ and a signal count $N_{Rc}$ are calculated through the determination calculation, in which the signal count $N_{Fc}$ is determined as the count of signals from the scintillator array 11F, and the signal count $N_{Rc}$ is determined as the count of signals from the scintillator array 11R. In this invention, $R_2=N_{Fc}/N_{Rc}$ is defined as a second signal count ratio. Until now, it is the inspection stage of the γ-ray detector single unit.

Figure 15:
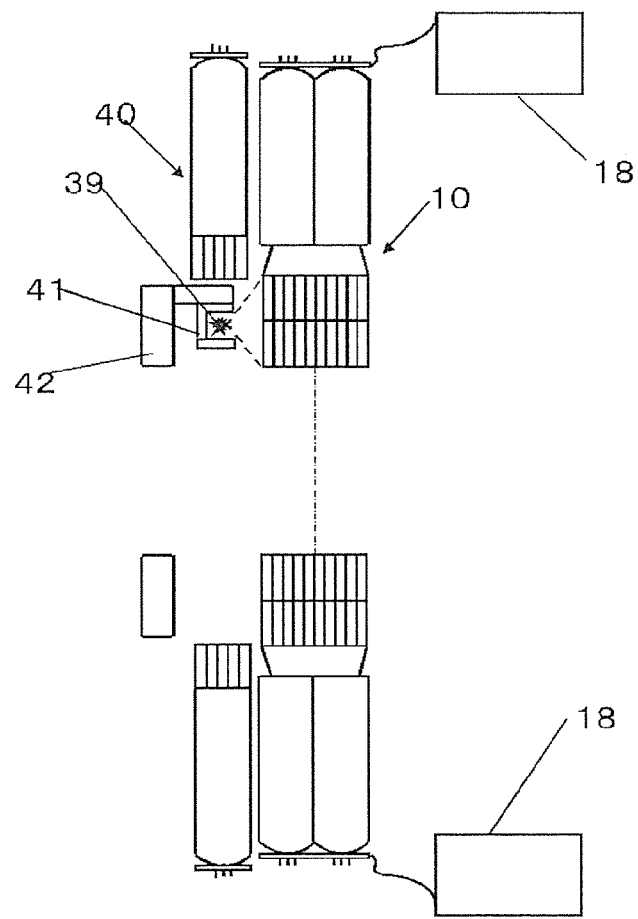
FIG. 15 is an illustrative view of the method for deciding the parameters according to the third embodiment.
Figure 16:
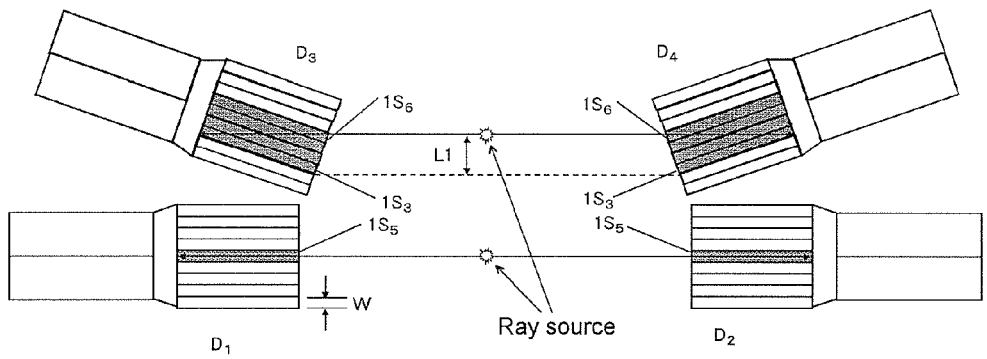
FIG. 16 is an illustrative view of a γ-ray detecting principle of an existing γ-ray detector.
Figure 17:
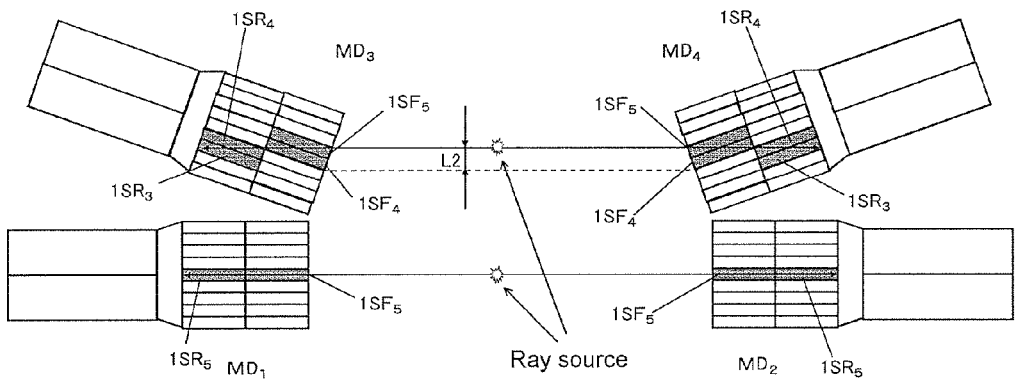
FIG. 17 is an illustrative view of a γ-ray detecting principle of an existing DOI γ-ray detector.
Figure 18:
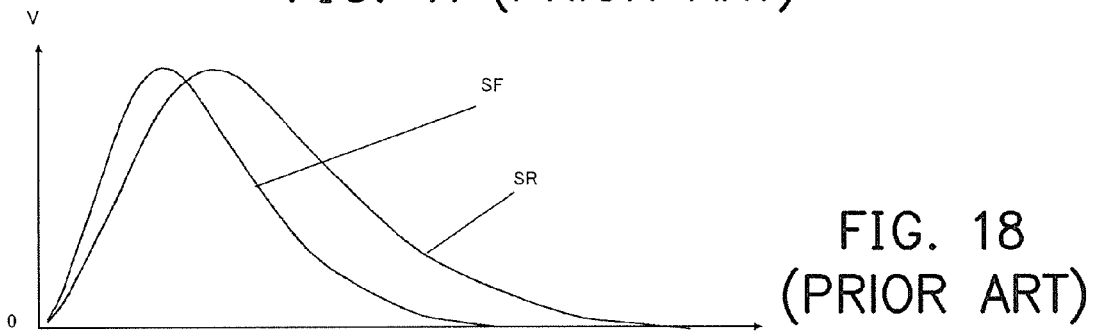
FIG. 18 is a waveform diagram of an electrical signal output from the existing DOI γ-ray detector.
Figure 19:
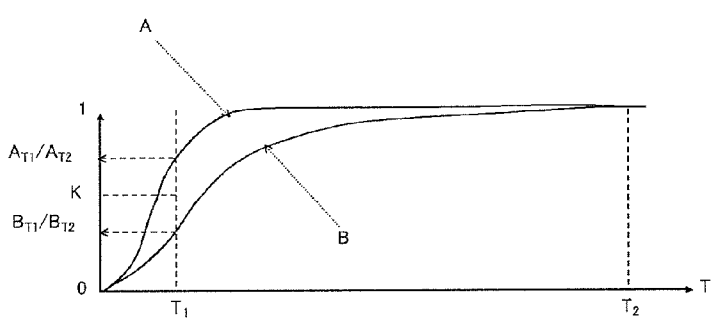
FIG. 19 shows values obtained by integrating the data of a time series output from the existing DOI γ-ray detector.
Figure 20:
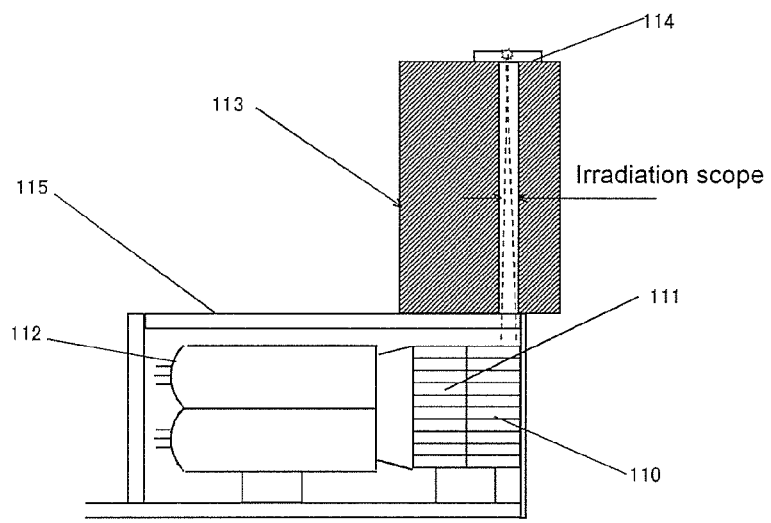
FIG. 20 is an illustrative view of the method for deciding the parameters of an existing nuclear medical diagnostic device.
Figure 21:
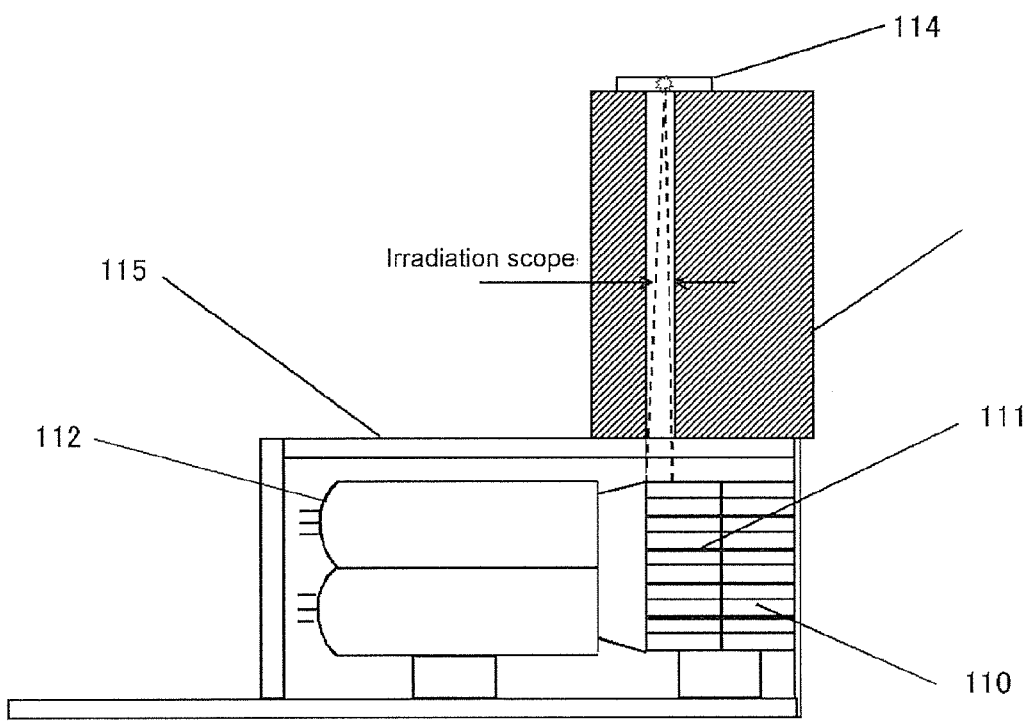
FIG. 21 is an illustrative view of the method for deciding the parameters of the existing nuclear medical diagnostic device.
Figure 22:
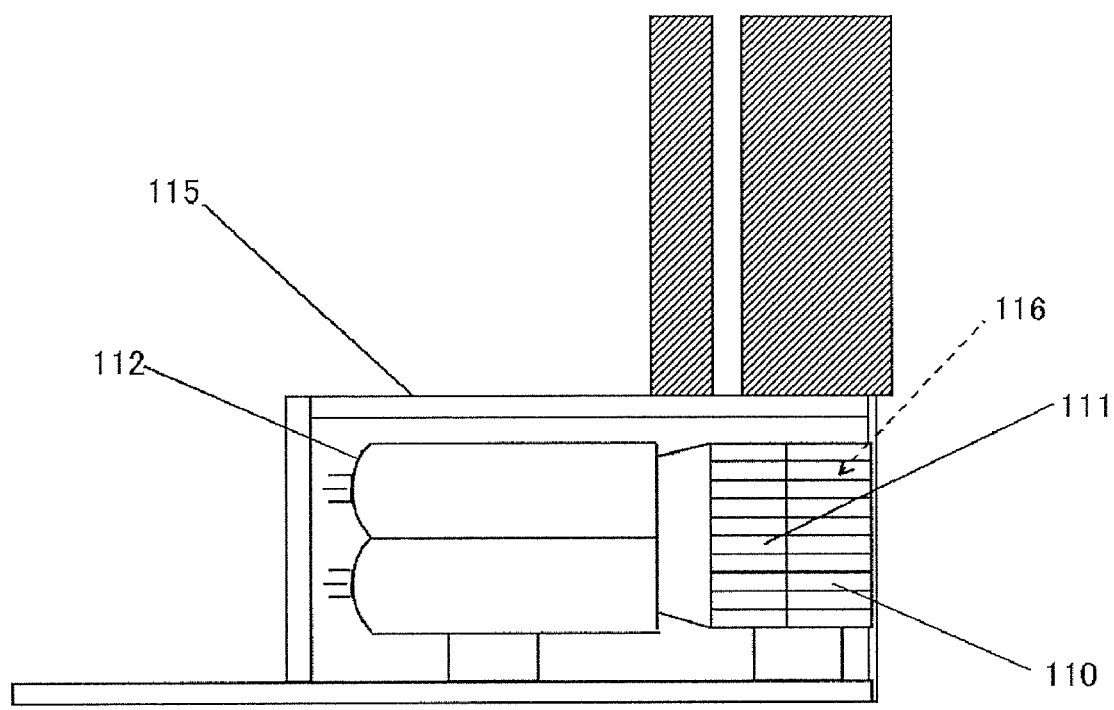
FIG. 22 is an illustrative view of the method for deciding the parameters of the existing nuclear medical diagnostic device.

Then, as shown in FIG. 15, during a third inspection stage, the plurality of γ-ray detectors 10 is installed in a frame (not shown) according to the actual number of the formed PET devices. Each γ-ray detector 10 is connected to a processing circuit for the device 18. FIG. 15 only shows the γ-ray detectors disposed along ¼ of the entire circumference; but in reality, the γ-ray detectors are present along the entire circumference, and the γ-ray detectors are accommodated in an appropriate dark box (not shown). In addition, it is preferred that the frame actually forming the PET device is being used as the frame; but a dedicated frame for inspection may also be used. Further, no matter the processing circuit for inspection 16 and the processing circuit for the device 18 used during the inspection stage are manufactured according to the same specification, temperature characteristics of a gain amplifier and other elements may be slightly different so as to generate individual differences. Therefore, the optimal parameters $T_1$, $T_2$, and K decided above are not necessarily consistent, such that the optimal parameters must be decided again. However, the optimal parameters $T_1$, $T_2$, and K decided above are temporarily used as the initial values and input to the processing circuit for the device 18.

As shown in FIG. 15, a rotating ray source for transmission 39 is arranged on a position at the distance 1 relative to all the γ-ray detectors 10. In addition, in order to obtain absorption correction data, the ray source for transmission 39 and detectors for transmission 40 are usually arranged in the PET device. Accordingly, the ray source for transmission 39 may irradiate sequentially the γ-ray on the detectors for transmission 40 through a rotating mechanism 42. The ray source for transmission 39 is arranged in a lead case 41, and has an openable window used to irradiate the γ-ray detectors 10 and an openable window used to irradiate the detector for transmission 40. The ray source for transmission 39 may irradiate sequentially the γ-ray on the lateral sides of the γ-ray detectors 10 through the rotating mechanism 42.

According to the input parameters, in the processing circuit for the device 18, a signal count $N_{Fc}'$ and a signal count $N_{Rc}'$ are calculated through the determination calculation, in which the signal count $N_{Fc}'$ is determined as the count of signals from the scintillator array 11F, and the signal count $N_{Rc}'$ is determined as the count of signals from the scintillator array 11R. In this invention, $R_3=N_{Fc}'/N_{Rc}'$ is defined as a third signal count ratio. Therefore, the condition of the parameter that enables the second signal count ratio $R_2=N_{Fc}/N_{Rc}$ obtained above and the third signal count ratio $R_3=N_{Fc}'/N_{Rc}'$ calculated this time being equal is identified, and the parameters are defined as optimal parameter values $T'_1$, $T'_2$, and $K'$ required by the scintillator array identification mechanism.

In the nuclear medical diagnostic device of the present invention, by adopting the above method, the optimal parameter values may be correctly and simply decided without using special external ray sources. A high image quality is thereby maintained, such that the high image quality is achieved through a simple operation. Further, after the γ-ray detectors are installed in the actual PET device, the large lead calibration jig matching with the PET device is not required, so the operation is quite easy.

The present invention is not limited to the embodiments above, and may also be implemented in the following variations.

In the embodiments, the PET device is taken as an example for illustration. However, the present invention may be applied to other nuclear medical diagnostic devices besides the PET device, as long as the devices may at the same time count the radioactive rays emitted from the detected body on which the radioactive agent is applied.

The embodiments of the present invention may be applied in a device formed by combining the nuclear medical diagnostic device and an X-ray CT device as a PET-CT having the PET device and the X-ray CT device.

In the embodiments, the scintillator block 1 is farmed by combining the two (layers of) scintillator arrays 11F and 11R, but may also be formed by combining a plurality of (layers of) scintillator arrays besides two (layers of) scintillator arrays. Further, the number of the scintillators in each of the scintillator arrays 11F and 11R is 8×8, but may also be multiple besides 8×8.

In the embodiments, the light receiving elements are the photomultipliers 31~34, but other light receiving elements may also be used, for example, photodiodes or avalanche photodiodes.

INDUSTRIAL AVAILABILITY

As described above, the present invention is suitable for medical and industrial radiation imaging devices.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A nuclear medical diagnostic device, comprising:
   a plurality of γ-ray detectors, wherein each of the γ-ray detectors is composed of a scintillator block, a light receiving element, and an A/D converter, the scintillator block is formed by optically combining a plurality of scintillator arrays with luminescence pulses in a γ-ray incident depth direction having different attenuation times, the light receiving element converts the luminescence pulse emitted from the scintillator block to an electric signal, and the A/D converter converts the electric signals output from the light receiving element, which are analog signals, to digital signals;
   a processing circuit for the device, for calculating a signal count ratio according to the digital signals from the γ-ray detectors;
   a frame, for installing the plurality of γ-ray detectors;
   a parameter deciding mechanism for identification, calculating a first signal count ratio according to the digital signals obtained by irradiating the γ-ray on each of the plurality of the scintillator arrays and obtaining a second signal count ratio by irradiating the γ-ray on the scintillator block and performing a measurement when the plurality of γ-ray detectors are not respectively installed in the frame but are connected to a processing circuit for inspection that is different from the processing circuit for the device, and obtaining a third signal count ratio by irradiating the γ-ray on the respective scintillator block of the γ-ray detectors and performing a measurement when the plurality of γ-ray detectors are respectively installed in the frame and are connected to the processing circuit for the device, and determining parameters for identification according to the first signal count ratio, the second signal count ratio, and the third signal count ratio; and an identification mechanism, for identifying which one of the plurality of the scintillator arrays of the plurality of γ-ray detectors is irradiated by the γ-ray of a measurement object according to the parameters for identification.

2. The nuclear medical diagnostic device according to claim 1, wherein
the second signal count ratio and the third signal count ratio are obtained by irradiating the γ-ray on a front surface or a rear surface of the scintillator block and performing the measurement.

3. The nuclear medical diagnostic device according to claim 1, wherein
the second signal count ratio and the third signal count ratio are obtained by irradiating the γ-ray on a lateral side of the scintillator block and performing the measurement.

4. The nuclear medical diagnostic device according to claim 3, wherein
a ray source for transmission is used to irradiate the γ-ray for obtaining the third signal count ratio.

* * * * *